(12) United States Patent
Glynn et al.

(10) Patent No.: US 10,508,623 B2
(45) Date of Patent: Dec. 17, 2019

(54) FILTER SYSTEM WITH AN INSULATING BODY, INSULATING BODY, AND METHOD FOR MANUFACTURING AN INSULATING BODY

(71) Applicant: Mann+Hummel GmbH, Ludwigsburg (DE)

(72) Inventors: Andrew Glynn, Bad Schoenborn (DE); Dennis Stark, Mauer (DE); Benoit Tronet, Bruchsal (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 113 days.

(21) Appl. No.: 15/724,534

(22) Filed: Oct. 4, 2017

(65) Prior Publication Data
US 2018/0094613 A1     Apr. 5, 2018

(30) Foreign Application Priority Data
Oct. 4, 2016   (DE) .................... 10 2016 011 774

(51) Int. Cl.
| | |
|---|---|
| *B01D 46/00* | (2006.01) |
| *B01D 46/42* | (2006.01) |
| *F02M 35/024* | (2006.01) |
| *A47K 4/00* | (2006.01) |
| *E03D 1/01* | (2006.01) |
| *A62C 3/00* | (2006.01) |
| *A62C 3/16* | (2006.01) |
| *H02G 3/04* | (2006.01) |
| *F02M 35/02* | (2006.01) |

(52) U.S. Cl.
CPC ...... *F02M 35/0205* (2013.01); *B01D 46/0005* (2013.01); *B01D 46/42* (2013.01); *B01D 46/4218* (2013.01); *B01D 2279/60* (2013.01); *F02M 35/0202* (2013.01); *F02M 35/024* (2013.01)

(58) Field of Classification Search
CPC ............... B01D 46/00; B01D 46/4218; B01D 46/0005; B01D 46/42; B01D 2279/60; A47K 4/00; E03D 1/01; A62C 3/00; A62C 3/16; H02G 3/04; H02G 3/0412; H02G 3/0487; F02M 35/0205; F02M 35/0202; F02M 35/024
USPC ........ 55/385.1, 385.3; 138/123–125; 169/45, 169/48; 174/48, 68.3, 99 R, 121 A
See application file for complete search history.

(56) References Cited

U.S. PATENT DOCUMENTS

| | | | | |
|---|---|---|---|---|
| 4,990,290 A | * | 2/1991 | Gill | A63J 5/025 239/590 |
| 4,994,649 A | * | 2/1991 | Roland, Sr. | A47G 19/12 219/432 |
| 5,633,077 A | | 5/1997 | Olinger | |

(Continued)

FOREIGN PATENT DOCUMENTS

WO       2010048647 A1       5/2010

*Primary Examiner* — Minh Chau T Pham
(74) *Attorney, Agent, or Firm* — James Hasselbeck

(57) ABSTRACT

A filter system for filtering a fluid, in particular an air filter system, is provided with at least a filter element arranged in a filter housing that is provided with at least an inlet and an outlet for the fluid. An insulating body which is formed of a flat insulation material is arranged so as to surround and tightly enclose an outer contour of the filter housing. An insulating body and a method for manufacturing the insulating body are described.

15 Claims, 5 Drawing Sheets

(56) References Cited

U.S. PATENT DOCUMENTS

| | | | | |
|---|---|---|---|---|
| 5,750,927 | A * | 5/1998 | Baltazar | A62C 3/16 |
| | | | | 169/48 |
| 8,015,634 | B1 * | 9/2011 | Lessard | E03D 1/01 |
| | | | | 220/4.06 |
| 2002/0141910 | A1 | 10/2002 | Adiletta | |
| 2005/0217625 | A1 | 10/2005 | Niaken et al. | |
| 2006/0096874 | A1 * | 5/2006 | Doran, Jr. | A45C 11/38 |
| | | | | 206/316.2 |
| 2013/0001125 | A1 | 1/2013 | Zachovalova et al. | |

* cited by examiner

FILTER SYSTEM WITH AN INSULATING BODY, INSULATING BODY, AND METHOD FOR MANUFACTURING AN INSULATING BODY

TECHNICAL FIELD

The invention concerns a filter system for filtering a fluid, in particular air filter system, with an insulating body, as well as an insulating body for a filter system, and a method for manufacturing an insulating body.

BACKGROUND

US 2005/0217625 A1 discloses an air filter system, comprising a housing that comprises, for example, a rear wall and a sidewall that each have an upper edge that is configured such that it is closed off by a hood of a vehicle so that the housing includes the vehicle hood in order to provide a thermal insulation of the intake air from the heat of the motor compartment. The air filter system is connected with an air intake manifold of the internal combustion engine by an air intake pipe. The housing comprises a diagonal plate to which the air intake pipe is fastened and through which it passes. The diagonal plate is arranged at an angle so that the air intake pipe is positioned such that an outlet end of the air intake pipe opens into the air intake manifold. A washable, reusable air filter that is supported by the air intake pipe filters the intake air and guides it through the air inlet pipe into the air intake manifold.

SUMMARY

It is an object of the invention to provide a filter system, in particular an air filter system, that is protected cost-efficiently from heat exposure.

Further objects of the invention are to provide an insulating body for a filter system, in particular an air filter system, that is inexpensively and easily mountable, as well as a method for manufacturing such an insulating body for a filter system.

The aforementioned object is solved with a filter system for filtering a fluid, comprising an insulating body that is formed of a flat insulation material, wherein the insulating body is arranged so as to surround an outer contour of a filter housing.

A further object is solved by an insulating body of a flat insulation material for a filter system which is provided as a detachable enclosure surrounding a filter housing of the filter system.

A further object is solved by a method for manufacturing an insulating body for a filter system which comprises joining of a cut-out semi-finished product in accordance with the outer contour of the filter housing.

Favorable embodiments and advantages of the invention result from the further claims, the description, and the drawing.

A filter system for filtering a fluid, in particular air filter system, is proposed, comprising at least a filter element in a filter housing which comprises at least an inlet and an outlet for the fluid, comprising an insulating body which is formed of a flat insulation material, wherein the insulating body is arranged so as to surround an outer contour of the filter housing.

The filter system according to the invention, in particular an air filter system, provides an insulating body as a heat shield with which the standard components of an air filter can resist even higher temperature specifications, especially when they occur only temporarily or for a short period of time, for example, after shutting down the engine/cooler, but also in permanent operation. Critical temperatures in defined regions, for example, in the motor compartment, can be generated and thus negatively impact the functionality of an air filter, for example, for the filtration of engine intake air. By means of the insulating body, it can be advantageously avoided that the components of the filter system are exposed to the critical temperatures and that a possible functional impairment of the filter system occurs. For example, the filtration of engine intake air can thus be maintained beneficially. The insulating body can advantageously be used, for example, for round air filters with round cross section, for parallelepipedal air filters, oval air filters with oval cross section, or other air filter arrangements which can be arranged in engine compartments.

Due to the solution according to the invention of thermally shielding the filter system with an insulating body as a heat shield, the use of specific materials for particular temperature applications such as, for example, glass fiber reinforced polyamide (e.g. PA6 GF 30) instead of the less expensive polypropylene (e.g. PP T20), as they are used conventionally in the prior art, can be advantageously avoided. Moreover, the components, for example, seals, filter element, and the like must not be matched to the higher temperature specifications. Accordingly, a cost-increasing complexity in variant management, for example, in order to serve niche markets with small lot sizes, can be avoided.

Due to the solution according to the invention of the insulating body, cost advantages are therefore provided because high quality material is significantly more expensive than standard material (e.g. PA6 GF 30 in place of PP T20) and separate heat shield functionality can be supplemented, as needed. The manufacture of filter systems can be designed to be cost-efficient because a configuration of the filter system with insulating bodies as heat shield is possible as needed. A simple installation of the insulating body results by insulation materials precut on site from continuous material which can be wound like a sleeve about the filter housing. A closure of the insulating body can be realized, for example, by welding but can also be embodied self-adhesive. No special variants, for example, different plastic material, different filter element, seals, and adhesives are required in order to fulfill the temperature specifications.

Accordingly, an increase of the temperature resistance of the filter system is advantageously possible in regard to permanent temperature, but primarily for short-term temperature peaks in the range of 5 to 60 min, for example, after shutting down the engine/cooling, of standard components such as filter housing, seals, filter elements in plastic air filter systems. An otherwise conventional aluminum heat shield that is to be manufactured by forming tools in a complex manner can be avoided with the solution of the present invention.

The filter system according to the invention provides a heat shield/shielding function for radiation and convection heat proportions. Since the intake air of the engine can be kept cooler, the efficiency of the combustion process of the engine can be advantageously increased.

A combination with additional functionalities is conceivable, for example, an individualization of the products with customer-specific colors/prints.

Also, an additional positive effect with regard to acoustic aspects such as sound damping is to be expected. Advantageously, an insulating body can also gain importance for other product groups such as liquid filters. An additional shielding of components with an insulating body, for example, air conducting lines, in order to avoid heating of the engine intake air in order to maintain the energy density and thus the efficiency of the combustion process of the engine can also be advantageous.

According to an advantageous embodiment, the insulating body can enclose tightly the filter housing. In this way, convection proportions of the heat transfer to the filter system can be reduced or even entirely avoided. Also, mounting space can be saved beneficially in this way and a retrofitting insulation of a filter system is enabled in this way.

According to an advantageous embodiment, the insulating body can comprise cutouts for components that are projecting away from the filter housing. The insulating body can thus tightly enclose the actual filter housing which is beneficial with respect to heat insulation reasons and also with respect to mounting space. Cutouts for attachments such as holders, legs, bottom plates or inlets and outlets of the filter housing can however be cut out from the sleeve of the insulating body. In this way, the installation of the filter system with insulating body is expediently simplified also.

According to an advantageous embodiment, the insulating body can be arranged detachably on the outer contour of the filter housing. In this way, it is possible that the insulating body is attached only after installation of the filter system at its installation site so that installation is significantly facilitated. And, on the other hand, the insulating body can be removed separately when, for example, the filter element is to be exchanged in the installed filter housing. Also, it is possible to replace the insulating body, as needed, when soiled or damaged. In this way, the insulating body can be attached also by retrofitting to the filter system.

According to an advantageous embodiment, the insulating body can be arranged so as to surround the inlet and/or the outlet. In this way, it is possible to arrange the insulating body so as to surround the filter system to the greatest possible extent. By enclosing also the inlet and/or the outlet of the filter system, the air intake system of an engine can be thermally insulated almost completely when, for example, the insulating body is extended up to an exhaust gas turbocharger.

According to an advantageous embodiment, the insulating body can be openable at least at one longitudinal side. In this way, the insulating body can be removed expediently from the filter housing without having to demount the filter system. The insulating body can thus surround like a jacket or a sleeve the filter housing completely and can still be retrofitted to an installed filter system or, as needed, also removed again. For this purpose, the insulating body can be provided, for example, with a zipper closure or with patent fasteners or can also be closed by clamps or clips, for example, also packaging binders.

According to a further aspect of the invention, an insulating body of a flat insulation material is proposed for a filter system, wherein a detachable enclosure surrounding a filter housing of the filter system is provided. The insulation material can surround the filter housing to the greatest possible extent with required cutouts that are provided, for example, for fastening elements or inlet, outlet, dust outlet of the filter housing. The insulation material can advantageously enclose the filter housing in the form of a sleeve or a jacket, and can be, for example, openable at a longitudinal side in order to be able to remove the insulating body or also retrofit it on a filter system. The insulating body can enclose the filter housing as tightly as possible. In this way, convection proportions of the heat transfer to the filter system can be reduced or even entirely avoided. Also, in this way mounting space can be saved beneficially and a retrofitting insulation of a filter system can thus be enabled.

According to an advantageous embodiment, the insulation material can comprise a foamed material. A foamed insulation material, for example, foamed polyurethane, exhibits in most cases good thermal insulating behavior and, on the other hand, can be processed easily. Also, foamed insulation material has minimal weight and can be matched favorably also to complex mounting spaces.

According to an advantageous embodiment, the insulation material can comprise at least a support layer and/or a fabric layer and/or a heat-reflecting layer. The support layer in this context can form a supporting structure for the insulating body while the fabric layer can reduce convective heat transfer. The heat-reflecting layer, for example, in the form of an infrared mirror, can reduce heating of the filter system by radiant heat. A combination of two or even three layers is particularly beneficial with respect to insulation.

According to an advantageous embodiment, the insulation material can be of a multilayer configuration, in particular comprise at least a support layer, a fabric layer, and a heat-reflecting layer. The combination of three layers provides a stable supporting configuration of the insulating body and thus a beneficial mechanical construction as well as, in its function as a heat shield, an advantageous reduction of convective heat transfer and radiation heat.

According to an advantageous embodiment, the fabric layer can comprise glass fiber fabric or rock wool. Glass fiber fabric as well as rock wool are well suited in order to effectively prevent convection of air about the filter housing and to reduce convective heat transfer in this way. Both materials can also be procured and processed inexpensively. And both materials are also already employed usually for heat insulation tasks in automotive engineering so that disposal thereof is also no problem.

According to an advantageous embodiment, the heat-reflecting layer can be designed to reflect infrared radiation. The heat-reflecting layer, for example, in the form of an infrared mirror, can effectively reduce heating of the filter system by radiant heat. The infrared proportion represents the significant proportion of thermal radiation and can originate from neighboring devices and components, for example, motor, exhaust system, exhaust return, that usually are installed in the engine compartment of motor vehicles and thus in the vicinity of air conducting systems.

According to a further aspect of the invention, a method for manufacturing an insulating body for a filter system is proposed, comprising at least the steps of producing a pattern in accordance with an outer contour of a filter housing of the filter system, cutting a semi-finished product in accordance with the pattern from an insulation material in continuous form, and joining the cut-out semi-finished product in accordance with the outer contour of the filter housing. The insulating body can advantageously be manufactured of flat insulation material that can be configured of several layers including support layer and/or fabric layer and/or heat-reflecting layer. For this purpose, expediently the developed outer contour of the filter housing is transferred to a pattern. Subsequently, the semi-finished product is cut in accordance with the pattern from a roll material, and, subsequently, the cut-out semi-finished product is placed in form of a sleeve or a jacket onto the outer contour of the filter housing from the exterior and is suitably joined. In this way, the filter housing can be covered completely with the insulation material with the exception of cutouts for fastening elements and/or inlets and/or outlets. The insulating body installed about the filter housing can then be closed with suitable fastening elements and fastened to the filter system and/or a vehicle body.

According to an advantageous embodiment, as insulation material a foamed material can be employed. A foamed insulation material, for example, foamed polyurethane, exhibits in most cases good thermal insulating behavior and can be processed easily, on the other hand. Also, foamed insulation material has a minimal weight and can be adapted beneficially even to complex mounting spaces.

According to an advantageous embodiment, the cut-out semi-finished product can be joined with at least one of the joining processes clamping together, gluing, snapping together, welding, binding, and sewing. When the semi-finished product is placed about the filter housing, the insulating body can be formed by closing and fastening with a series of joining processes. In particular, fastening elements can be used which in a simple way can also be released again, for example, brackets, clips, clamps, because, in this way, the insulating body can also be removed again in a simple way from the filter housing.

According to an advantageous embodiment, cutting out the semi-finished product can be performed with at least one of the cutting processes laser cutting, water jet cutting, and knife cutting. These cutting processes are cost-efficient flexible methods which in an advantageous manner make it possible to cut even complex structures from the flat insulation material because they can be used in particular with CAD control. These cutting processes are also beneficial for multilayer insulation materials with support layer, fabric layer and heat-reflecting layer as the various layers exhibit different cutting properties.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to other meaningful combinations.

DETAILED DESCRIPTION

Figure 1:
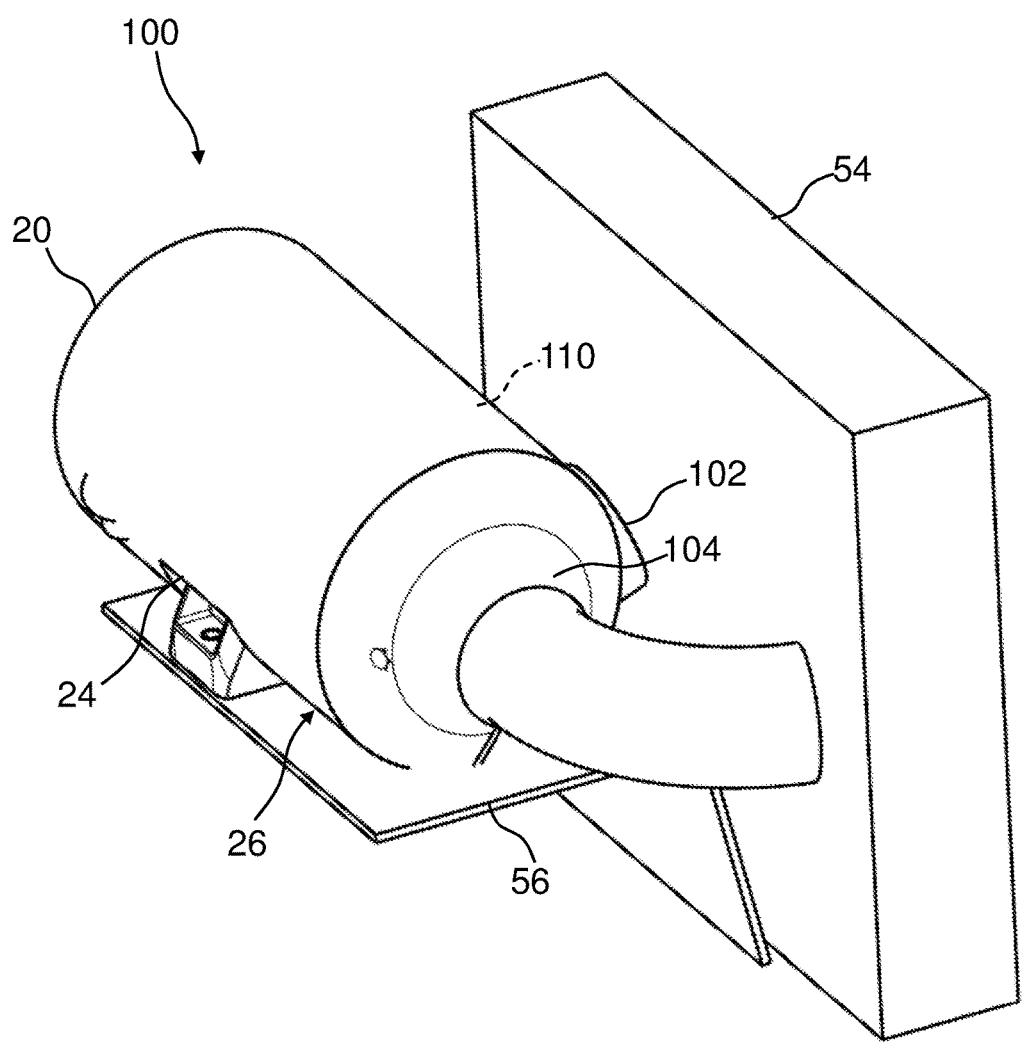
FIG. 1 shows an embodiment of a filter system with an insulating body according to an embodiment of the invention with connection to a cooler in isometric illustration.

In the Figures, same or same type of components are identified with same reference characters. The Figures represent only examples and are not to be understood as limiting.

Figure 2:
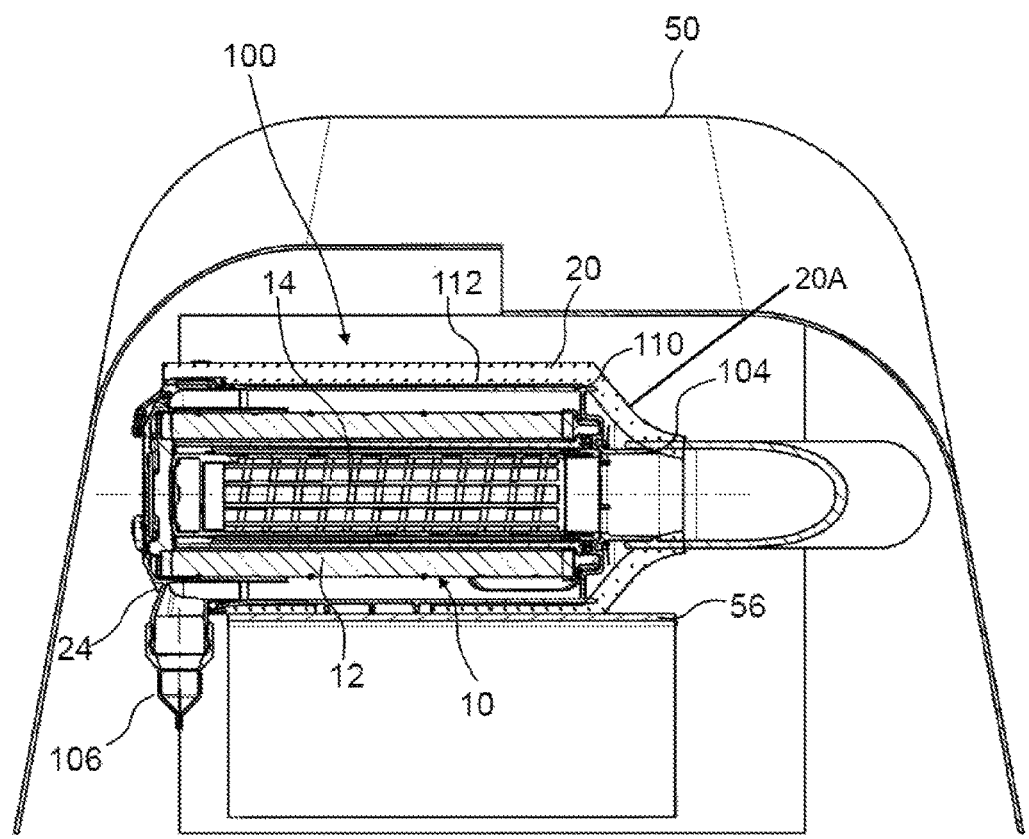
FIG. 2 shows a longitudinal section of the filter system with insulating body according to FIG. 1, which is arranged in a motor compartment.

FIG. 1 shows schematically an embodiment of a filter system 100 with an insulating body 20 according to an embodiment of the invention with connection to a cooler 54 in isometric illustration. In FIG. 2, a longitudinal section of the filter system 100 with insulating body 20 according to FIG. 1 is illustrated in an exemplary arrangement in an engine compartment underneath an engine hood 50; the arrangement is illustrated isometrically in FIG. 3.

The filter system 100 in the form of an air filter system comprises a filter element 10 with a filter body 12 (see FIG. 2) that is flowed through in radial direction from the exterior to the interior in a filter housing 110 which comprises an inlet 102 and an outlet 104 for the fluid, i.e., air in the embodiment. In this embodiment, the inlet 102 is arranged laterally and the outlet 104 centrally. The filter body 12, as can be seen in the section in FIG. 2, is arranged on a radial inner support pipe 14.

The filter housing 110 is surrounded by an insulating body 20 which is formed of a flat insulation material 22 wherein the insulation material 20 is arranged so as to surround an outer contour 112 of the filter housing 110. The insulating body 20 encloses the filter housing 110 tightly and is extending forward across the inlet 102 and the outlet 104 so as to enclose them. The filter housing has at least two connection ports: inlet 102 and outlet 104. The insulating body 20 forms a conic projection 20A which extends axially outwardly from an axial end of the filter housing 110 across the outlet 102 and encloses the outlet 102 in the insulating body 20. The insulating body 20 comprises cutouts 24 for the components projecting away from the filter housing 110 such as holders, for example, the carrier 56 of the filter housing 110, but also inlet 102, outlet 104 as well as dust outlet 106 (see FIGS. 2 and 3). The insulating body 20 is detachably arranged on the outer contour 112 of the filter housing 110 and can be opened, for example, on a longitudinal side 26, and removed from the filter housing 110.

The insulation material 22 (FIG. 4) of which the insulating body 20 is formed can comprise, for example, a foamed material which constitutes a lightweight material and exhibits good heat insulation properties. In particular, the insulation material 22 can comprise at least a support layer and/or a fabric layer, and/or a heat-reflecting layer. The insulation material 22 can be of a multilayer configuration and can comprise in particular at least a support layer, a fabric layer, and a heat-reflecting layer. The fabric layer can comprise, for example, glass fiber fabric or rock wool while the heat-reflecting layer can be configured to reflect infrared radiation, i.e., can be embodied as an infrared mirror.

Figure 3:
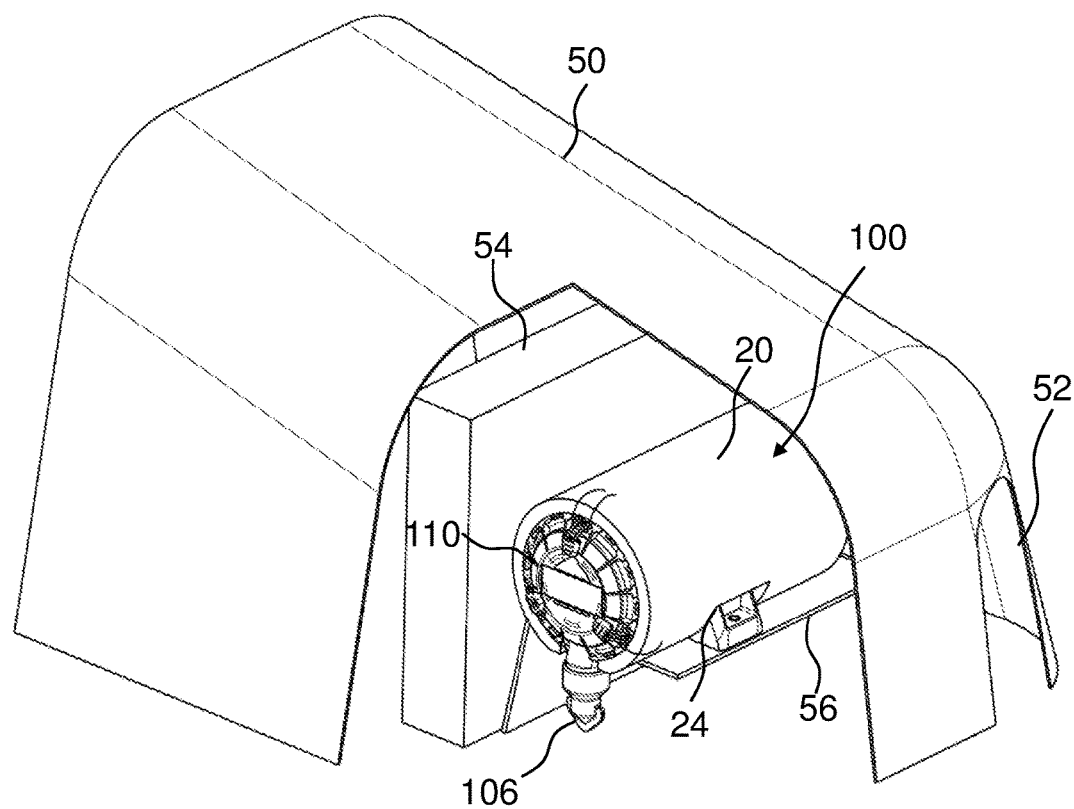
FIG. 3 shows the arrangement of the filter system of FIG. 2 in isometric illustration.

In FIGS. 2 and 3, a possible arrangement of the filter system 100 underneath the engine hood 50 is illustrated which is sectioned at one end to show the filter system 100 and, in FIG. 3, comprises a further cutout for a headlight. Inlet 102 and outlet 104 serve for supply and discharge of the fluid to be filtered, i.e., in particular air, while the dust outlet 106 is provided for discharging collected dirt and dust from the filter housing 110. In the longitudinal section illustrated in FIG. 2, it can also be clearly seen how the insulating body 20 is extended from the filter housing 110 across the beginning of the outlet 104 and therefore also encloses the outlet 104 tightly.

Figure 4:
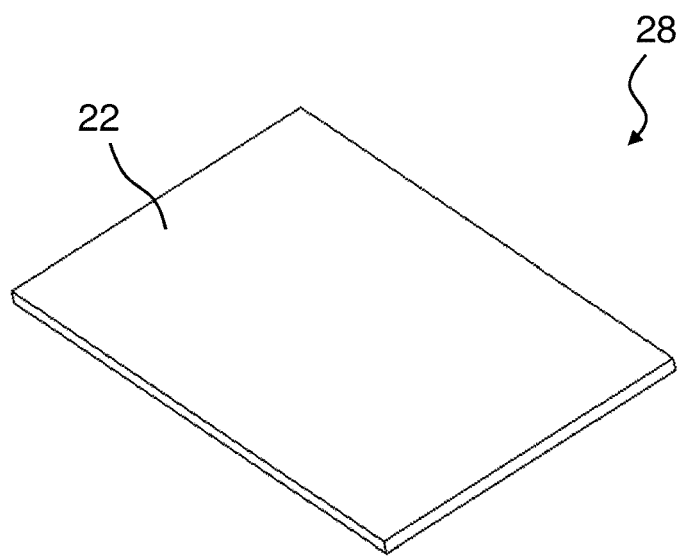
FIG. 4 shows raw material for an insulating body according to an embodiment of the invention.

According to an embodiment of the invention, FIG. 4 shows a flat insulation material 22 in the form of a flat plate as raw material 28 for an insulating body 20 (FIGS. 1 to 3, 6). As insulation material 22, for example, a foamed material, in particular a foamed plastic material, can be used. In particular, the insulation material 22 can comprise at least a support layer, and/or a fabric layer, and/or a heat-reflecting layer. The insulation material 22 can be of a multilayer configuration and, in particular, can comprise at least a support layer, a fabric layer, and a heat-reflecting layer. The fabric layer can comprise, for example, glass fiber fabric or rock wool while the heat-reflecting layer is embodied to reflect infrared radiation, i.e., is embodied as an infrared mirror.

Figure 5:
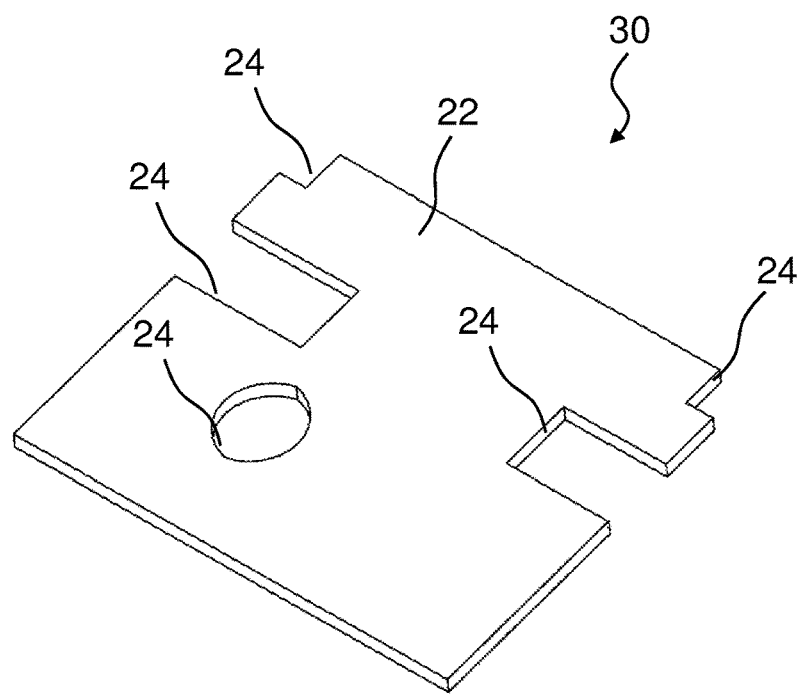
FIG. 5 shows a semi-finished product for an insulating body according to an embodiment of the invention with cutouts.

In FIG. 5, a semi-finished product 30 for an insulating body 20 according to an embodiment of the invention is illustrated with cutouts 24. In this context, the semi-finished product 30 is cut in accordance with a pattern, which is produced according to an outer contour 112 of a filter housing 110 of the filter system 100 by developing the outer contour 112, from an insulation material 22 as raw material 28 provided in sheets, as shown in FIG. 4, or in continuous form, for example, as roll material. The semi-finished product 30 exhibits thus different cutouts 24 for fastening means or inlet 102 and outlet 104 of a filter housing 110. Cutting out the semi-finished product 30 can be done, for example, with one of the cutting processes laser cutting, water jet cutting, and knife cutting.

Subsequently, the cut-out semi-finished product 30 in accordance with the outer contour 112 of the filter housing 110 can be placed and joined about the filter housing 110. The semi-finished product 30 which has been cut out and placed against the outer contour 112 of the filter housing 110 can be joined in this context by one of the joining processes clamping together, gluing, snapping together, welding, binding, and sewing.

Figure 6:
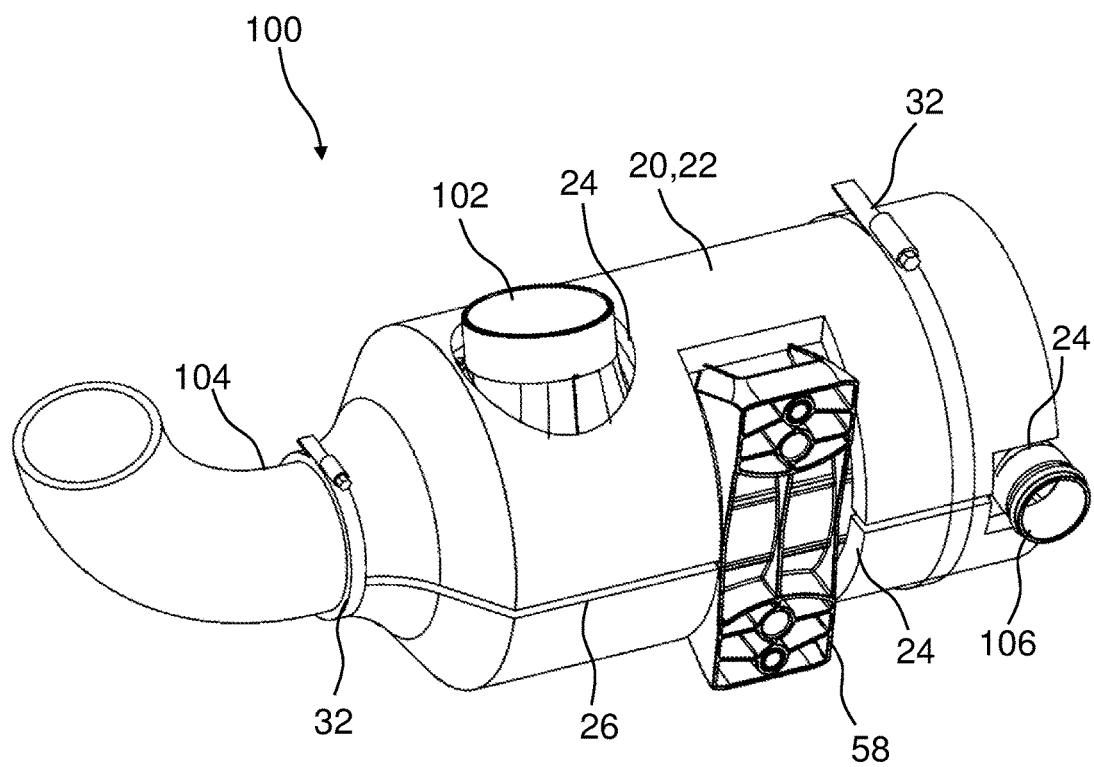
FIG. 6 shows a filter system with mounted insulating body according to an embodiment of the invention.

In FIG. 6, a filter system 100 with mounted insulating body 20 according to an embodiment of the invention is illustrated in this context. The insulation material 22 as a cut-out semi-finished product 30, as illustrated in FIG. 5, is placed tightly about the filter housing 110 wherein the corresponding cutouts 24 in the semi-finished product 30 provide passages for inlet 102, outlet 104, dust outlet 106, and the holder 58. The insulation material 22 encloses tightly and covers the outlet 104. The insulation material 22 is closed along the longitudinal side 26 to form the finished insulating body 20 and is secured with two clamps 32. Alternatively, the insulating body 20 could be closed and secured, for example, by clamping together, gluing, snapping together, welding, binding, or sewing.

While specific embodiments of the invention have been shown and described in detail to illustrate the inventive principles, it will be understood that the invention may be embodied otherwise without departing from such principles.

What is claimed is:

1. A filter system for filtering a fluid, comprising:
    a filter housing comprising:
        an axially elongated housing outer wall surrounding an interior chamber;
        an end wall closing an axial end of the axially elongated housing outer wall of the filter housing; and
        a housing connection port arranged centrally on the end wall of the filter housing and projecting axially outwardly away from the filter housing;
        wherein the connection port is a fluid inlet or fluid outlet of the filter housing;
    an exchangeable hollow filter element arranged in the interior chamber of the filter housing, a hollow interior of the exchangeable hollow filter element connected to the housing connection port;
    an insulating body formed of a flat insulation material;
    wherein the flat insulation material is a multilayer material comprising:
        a fabric layer and/or a support layer;
        a heat reflecting layer forming an infrared mirror, reflecting infrared radiation away from the filter housing;
    the insulating body arranged on the outer walls of the filter housing so as to surround an outer contour of the filter housing, the insulating body forming a heat shield reducing convective heat transfer and reflecting infrared radiation away from the filter housing;
    wherein the insulating body at the end wall of the filter housing forms a conic projection, the conic projection projecting axially outwardly from the end wall of the filter housing and enclosing the housing connection port in the insulating body.

2. The filter system according to claim 1, wherein the insulating body encloses tightly the filter housing.

3. The filter system according to claim 1, wherein the insulating body comprises cutouts for accommodating components that are projecting away from the filter housing.

4. The filter system according to claim 1, wherein the insulating body is detachably arranged on the outer contour of the filter housing.

5. The filter system according to claim 1, wherein the insulating body is configured to enclose the inlet or the outlet.

6. The filter system according to claim 1, wherein the insulating body is configured to enclose the inlet and the outlet.

7. The filter system according to claim 1, wherein the insulating body is configured to open at least at one longitudinal side thereof.

8. An insulating body of a flat insulation material for a filter system according to claim 1,
    the insulating body configured as a detachable enclosure surrounding the filter housing of the filter system.

9. The insulating body according to claim 8, wherein the insulation material comprises a foamed plastic material.

10. The insulating body according to claim 8, wherein the insulation material comprises
    both a support layer and a fabric layer.

11. The insulating body according to claim 10, wherein the fabric layer comprises glass fiber fabric or rock wool.

12. A method for manufacturing an insulating body of a flat insulation material for a filter system according to claim 1, the insulating body configured as a detachable enclosure surrounding the filter housing of the filter system, the method comprising:
    providing a fabric layer and/or a support layer;
    providing a heat reflecting layer forming an infrared mirror, reflecting infrared radiation;
    forming the flat insulation material as a multilayer material comprising:
        the fabric layer and/or the support layer; and
        the heat reflecting layer;
    producing a pattern according to an outer contour of the filter housing of the filter system;
    cutting out a semi-finished product according to the pattern from the flat insulation material provided in continuous form, wherein during cutting, cutouts are formed in the semi-finished product, the cutouts positioned to align with projections on the filter housing;
    positioning the semi-finished product at the filter housing so cutouts in the semi-finished product will receive the projections on the filter housing;
    wrapping the semi-finished product about an outer contour of the filter housing, wherein the wrapping includes forming a conic projection enclosing an axially projecting connection port of the filter housing;

joining the semi-finished product to form the insulating body according to the outer contour of the filter housing.

13. The method according to claim 12, wherein the insulation material includes a foamed plastic material.

14. The method according to claim 12, performing joining the semi-finished product by at least one joining process selected from the group consisting of clamping together, gluing, snapping together, welding, binding, and sewing.

15. The method according to claim 12, performing cutting out the semi-finished product by at least one cutting process selected from the group consisting of laser cutting, water jet cutting, and knife cutting.

\* \* \* \* \*